United States Patent [19]

Petersen

[11] Patent Number: 4,974,228
[45] Date of Patent: Nov. 27, 1990

[54] MAGNETIC FIELD PROFILE FOR IMPROVED ION LASER PERFORMANCE

[75] Inventor: Alan B. Petersen, Palo Alto, Calif.
[73] Assignee: Spectra-Physics, Inc., San Jose, Calif.
[21] Appl. No.: 269,193
[22] Filed: Nov. 8, 1988
[51] Int. Cl.$^5$ ............................ H01S 3/00; H01S 3/03
[52] U.S. Cl. ........................................ 372/37; 372/61; 372/62; 372/67
[58] Field of Search ........................ 372/37, 61, 62, 67

[56] References Cited

U.S. PATENT DOCUMENTS

| | | | |
|---|---|---|---|
| 3,670,262 | 6/1972 | Hallock et al. | 372/62 |
| 3,993,965 | 11/1976 | Alves et al. | 372/37 |
| 4,649,547 | 3/1987 | Carlson et al. | 372/62 |
| 4,715,039 | 12/1987 | Miller et al. | 372/37 |
| 4,811,355 | 3/1989 | Krueger et al. | 372/62 |
| 4,847,841 | 8/1989 | Lamprecht et al. | 372/37 |

OTHER PUBLICATIONS

Ferdinand F. Cap, "Handbook on Plasma Instabilities", vol. I, (Academic Press, N.Y., 1976), Chapter 8, Plasma Containment, pp. 131–153.
Kobayashi et al., "Power Enhancement for Argon II Narow Tube Lasers by a Traverse Magnetic Field", (Appl. Phys. Lett. 40 (19), May 15, 1985) pp. 925–927.
Kobayashi et al., "Power Enhancement in Argon II Narrow-Tube Lasers Due to Zeeman Effect by a Transverse Magnetic Field", (IEEE Journal of Quantum Electronics, vol. QE-23, No. 5, May 1987) pp. 633–640.
The Lexel Laser pamphlet (Feb. 16, 1989).

*Primary Examiner*—Georgia Epps
*Attorney, Agent, or Firm*—Lyon & Lyon

[57] ABSTRACT

An ion laser is constructed with means for generating a magnetic confinement field operating in the cathode transition region of the laser. The magnetic confinement field is preferably generated by first and second magnetic windings, each axially aligned with the laser volume, but disposed so as to generate first and second magnetic fields which are of opposite polarity. The first and second magnetic fields of opposite polarity combine to create a region of zero axial magnetic field, which in a preferred embodiment is located substantially within the cathode transition region of the laser. In an alternate embodiment, the first and second magnetic fields are of the same polarity, and therefore generate a region of minimized axial magnetic field, preferably located substantially within the cathode transition region of the laser.

35 Claims, 2 Drawing Sheets

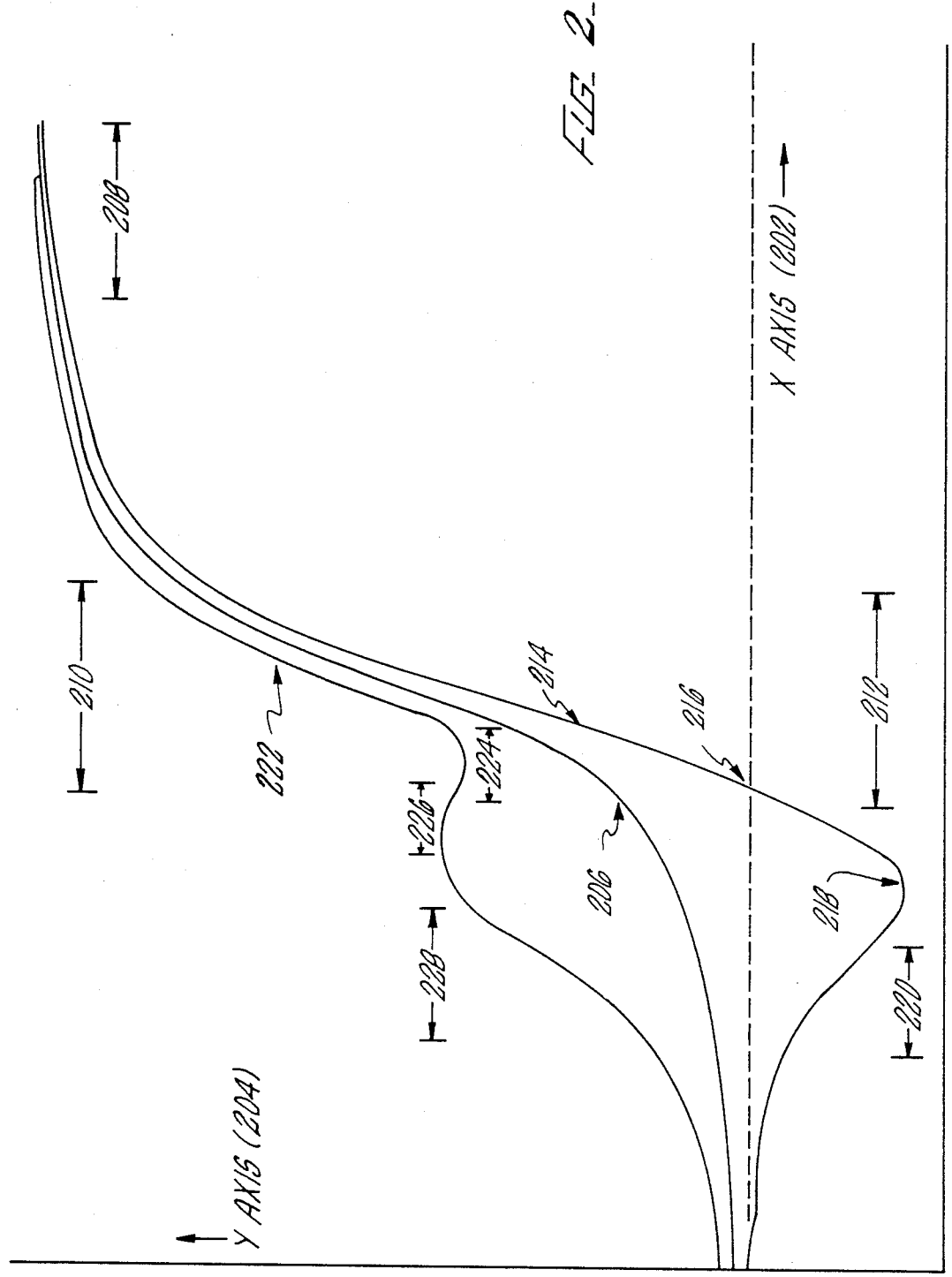

MAGNETIC FIELD PROFILE FOR IMPROVED ION LASER PERFORMANCE

BACKGROUND OF THE INVENTION

1. Field of the Invention

This invention relates to ionized-gas lasers. More specifically, this invention relates to altering the magnetic field profile in or near the cathode transition region of an ionized-gas laser.

2. Description of Related Art

An ionized-gas laser or ion laser is a type of laser, characterized by ionization of a gas and electrical discharge through that gas. Magnetic confinement of the gas, typically by a coaxially oriented electromagnetic solenoid, is often used to concentrate charged particles in the region of an arc discharge through the gas. As used herein, "magnetic confinement" means concentration of charged particles by means of a magnetic field. As is well known in the art, certain gases will exhibit population inversion under such circumstances, and will lase. As is also well known in the art, noble gases such as Neon, Argon, Krypton and Xenon are preferred for the operation of ion lasers of the type disclosed herein, but it will become clear to one of ordinary skill in the art, after perusal of the specification, drawings and claims herein, that other gases may also be incorporated in an embodiment of the invention, and the use of other gases does not lie outside the concept and scope of the invention.

Ion lasers and their operation, as well as other lasers of substantial applicability, are fully disclosed in section 2, volume 2 of the 1982 edition of the *CRC Handbook of Laser Science and Technology* (and references cited therein), each hereby incorporated by reference as if fully set forth herein. A detailed description of ion lasers would be well known to one of ordinary skill in the art, and accordingly is not repeated herein.

A typical ion laser may comprise a cathode and an anode for respectively sourcing and sinking charged particles through an ionized gas contained in a discharge volume, and a solenoid electromagnet for generating a coaxially aligned magnetic field for concentrating and aiding confinement of the ionized gas in a narrow, substantially cylindrical region of the discharge volume. In normal operation, currents of up to 65 amperes at 40 kilowatts of input power are typical. A glow discharge near the cathode is confined by a substantially cone-shaped region near the cathode (commonly called the "cathode transition region" or the "cathode throat region") and compressed into an arc discharge in an active region of the discharge volume. The arc discharge continues through the ionized gas to a region near the anode. While total current flow remains the same, the current density changes substantially in the cathode transition region. Similarly, there may also be an anode transition region near the anode.

In a typical ion laser, the arc discharge of the gas has high electrical and thermal conductivity. A large amount of heat is generated in the arc discharge and must therefore be dissipated somehow. Although there are a number of known methods for dissipation of such heat, two typical methods are as follows: (1) Heat may be dissipated to the structural walls which confine the gas by means of a plurality of thermally conductive disks placed parallel to each other and disposed across and around the arc discharge path. The center of each such disk may have a hole to allow the arc discharge to pass through without interference; these holes are typically largest near the cathode, successively smaller in the cathode transition region, and smallest in the main body of the discharge volume of the laser. (2) The structural walls may comprise a thermally conductive ceramic in direct thermal contact with the arc discharge. A discharge volume defined by such structural walls may be substantially similar to that defined by the thermally conductive disks of the first method above. These features are well known in the art and are consequently not described in detail herein.

In a typical ion laser, the cathode transition region may be subject to excessive sputtering of the material defining the cathode transition region, e.g. the thermally conductive disks or thermally conductive ceramic as noted above. High thermal stress and thermal loading in this region are also typical. These effects can cause a tendency toward local erosion of any materials placed near the cathode transition region, thus reducing the useful life of the ion laser itself.

A typical ion laser may also exhibit low efficiency in converting input electrical power into output laser light. At a constant discharge current, the efficiency of the laser is inversely proportional to the voltage across the discharge volume, so any method for reducing such voltage while maintaining output power is advantageous. Efficiency may be of interest with respect to certain regions of the electromagnetic spectrum, e.g. output visible light and output ultraviolet light. A typical ion laser may also exhibit substantial optical noise in its output, possibly arising from fluctuations of plasma density, temperature, and other parameters, within the discharge volume.

Known solutions to one or the other of these sets of problems include (1) longitudinal adjustment of the external position of a single coaxial solenoid winding which comprises the electromagnetic solenoid, (2) adjustment of the pressure of the ionized gas, (3) reducing the length of the discharge volume and/or (4) enlarging the diameter of the discharge volume. While these methods of the prior art may achieve some success, they are not completely satisfactory because they do not achieve the dramatic effect of this invention, and because they are generally unable to solve more than one problem at a time. Each prior art solution noted above typically achieves only minor reduction of the sputtering, thermal stress and thermal loading problems noted above, and may also reduce the efficiency of the laser. Accordingly, there is a need for an improved ion laser which addresses all of the problems noted above simultaneously.

SUMMARY OF THE INVENTION

An ion laser is constructed with means for generating a magnetic confinement field operating in the cathode transition region of the laser. The magnetic confinement field is preferably generated by first and second magnetic windings, each coaxially aligned with the discharge volume of the laser, but disposed so as to generate first and second magnetic fields which are of opposite polarity. The first and second magnetic fields of opposite polarity combine to create a region of zero axial magnetic field, which in a preferred embodiment is located substantially within the cathode transition region of the laser. In an alternate embodiment, the first and second magnetic fields are the same polarity, and therefore generate a region of minimized axial magnetic field, also preferably located substantially in or near the cathode transition region of the laser.

It will become clear to those of ordinary skill in the art, after perusal of the specification, drawings, and claims herein, that description of a magnetic confinement field of an embodiment of the invention in terms of its axial components is not the sole method of description. For example, description of the transverse components of such magnetic confinement field, which are related to the axial components by well known physical law, may also be employed, and remains within the concept and scope of the invention.

BRIEF DESCRIPTION OF THE DRAWINGS

FIG. 2 shows a plot of the axial magnetic fields exhibited by several different ion lasers.

DESCRIPTION OF THE PREFERRED EMBODIMENT

Figure 1:
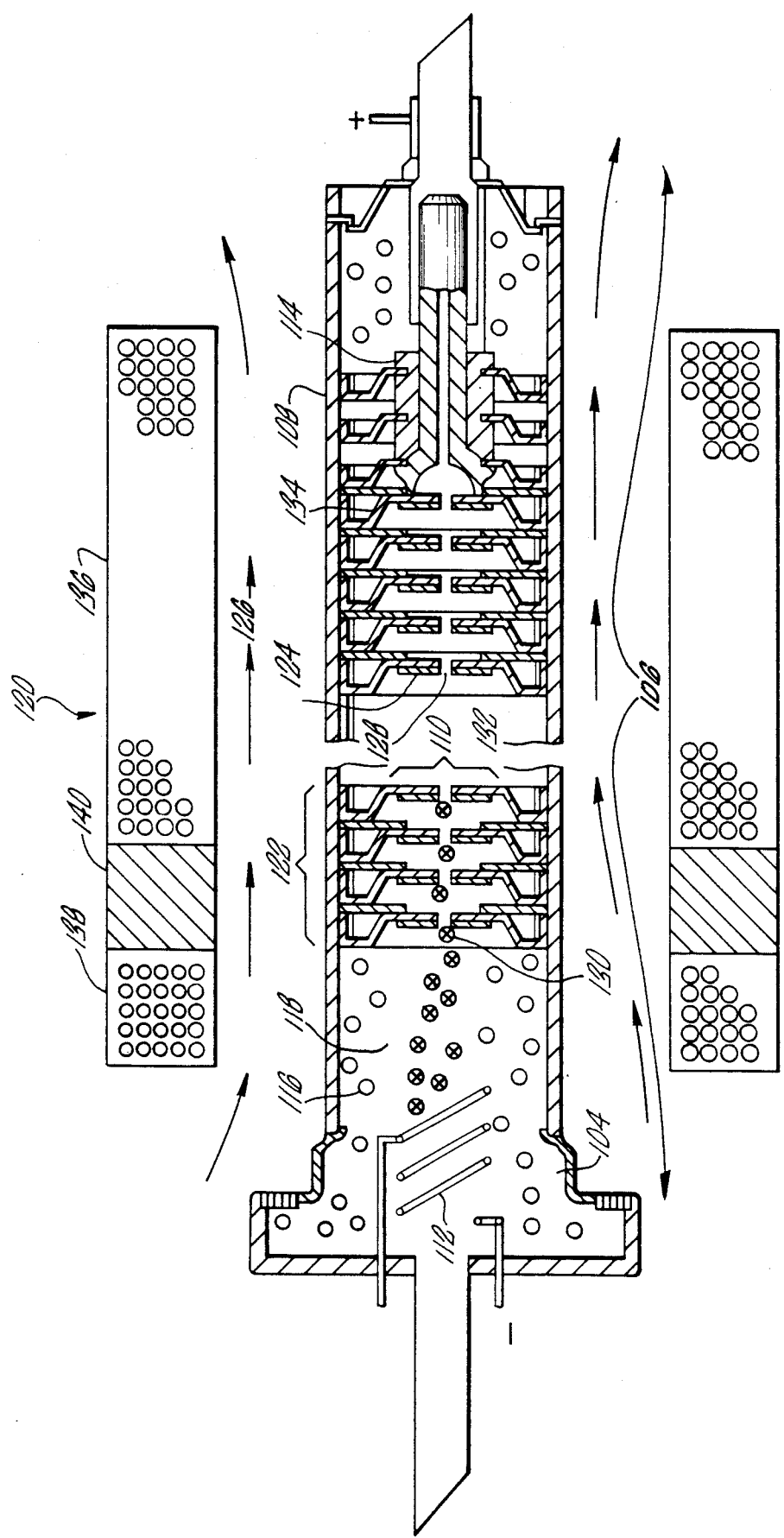
FIG. 1 shows a cross-sectional view of an ion laser.

FIG. 1 shows a cross-sectional view of an ion laser. An ion laser 102 may comprise a discharge volume 104 defined by a confining structure 106 which may be shaped in the form of a tube. The confining structure 106 may comprise a structural wall 108 and internal thermal components 110. The discharge volume 104 may contain a cathode 112, an anode 114, and a gas 116. In normal operation the gas 116 may be disposed between the cathode 112 and the anode 114, and may be confined by the structure 106 to stay within an ionized region 118 of the discharge volume 104. In normal operation, a magnetic winding 120 or other electromagnetic field generator may generate a magnetic field which is coaxially aligned with the discharge volume 104. As is well known in the art, when a voltage differential is introduced between the cathode 112 and the anode 114, and electric discharge is initiated, current will flow between the cathode 112 and the anode 114. In a preferred embodiment, a magnetic field is coaxially aligned with the discharge volume 104 as well, causing ions within the gas 116 to become highly energized and concentrated along an axis of electric discharge. In a preferred embodiment, the gas 116 may be one or more noble gases, e.g. Argon.

As is well known in the art, in normal operation the ionized gas 116 will generate substantial heat, and energetic particles within the gas 116 will tend to erode the internal thermal components 110 of the structure 106 in a region 122 near the cathode 112. This region 122 is commonly known in the art as the "cathode transition region".

In a preferred embodiment the internal thermal components 110 may comprise a plurality of disks 124 disposed across the discharge volume 104 and axially aligned parallel to the axis of the discharge volume 104. In a preferred embodiment, each of the disks 124 is thermally connected to the structure 106, and the structure 106 is cooled by a cooling system 126, as is well known in the art. The cooling system 126 may employ air or water, or some other substance, to carry excess heat away from the structure 106 and to prevent melting or other thermal stress, as is well known in the art.

In a preferred embodiment, each of the disks 124 is shaped to define a primary hole 128 in the center of the disk 124 so that an electric arc 130 may pass freely between the cathode 112 and the anode 114. In a preferred embodiment, each of the disks 124 is also shaped to define a plurality of secondary holes 132 disposed other than at the center of the disk 124, so that gas 116 may pass freely between spaces 134 formed between pairs of disks 124.

A primary solenoid winding 136 about the confining structure 106 generates a primary magnetic field which is coaxially aligned parallel to the axis of the discharge volume 104. A secondary solenoid winding 138 generates a secondary magnetic field which is also coaxially aligned parallel to the axis of the discharge volume 104. This secondary magnetic field may be of opposite polarity to the primary magnetic field, or it may be the same polarity, but in a preferred embodiment, it will be of opposite polarity. In a preferred embodiment, a spacer 140 positioned about the structure 106 separates the primary winding 136 from the secondary winding 138.

In a preferred embodiment, the primary winding 136 may be much larger than the secondary winding 138, both in number of turns of wire and in the strength of magnetic field which it generates. In a preferred embodiment, the primary winding 136 may comprise about 13 layers of winding about a bobbin of diameter 2.25 inches, totalling about 8700 turns of size number 15 type wire in about 39 inches of coil length, for a magnetic field strength of about 1600 Gauss, and with a winding resistance of about 22.5 ohms. In a preferred embodiment, the secondary winding 138 may comprise about 12 layers of winding about a bobbin of diameter 2.25 inches, totalling about 220 turns of size number 15 type wire in about 1 inch of coil length, for a magnetic field strength of about 525 Gauss, and with a winding resistance of about 0.6 ohms. In a preferred embodiment, the spacer 140 separates the primary winding 136 from the secondary winding 138 by a gap of about 1.3 inches. When both solenoids are powered, a maximum negative polarity magnetic field of about 370 Gauss may be generated.

Addition of the secondary winding 138 and the spacer 140 to the primary winding 136 has dramatic effects on the problems noted above, including reduction of operating voltage, as well as sputtering, thermal stress and thermal loading problems in the cathode transition region. A preferred embodiment ion laser is observed to require about 10-15% less input power to generate equivalent output power (e.g. up to about 65 volts less required for a 550 volt ion laser). While a preferred embodiment may exhibit a slight 2-4% reduction of visible output power, ultraviolet output power is believed to increase substantially, about 10-15%, for an overall improvement in both visible and ultraviolet output efficiency. Substantial reduction in optical noise is also believed to be achieved.

A preferred embodiment is believed to achieve these dramatic effects by forming a region in or near the cathode transition region known as a "magnetic trap". Such a magnetic trap tends to contain charged particles within a plasma formed in the discharge volume, and affects densities and temperatures characteristic of that plasma. The plasma concentration achieved by such a magnetic trap may assist the disks 124 in compressing the electric current from a glow discharge into an arc discharge within the cathode transition region. The combination of the primary winding 136, the secondary winding 138 and the spacer 140 causes a magnetic field region to form which has zero (or at least minimized) axial magnetic component. This effect is disclosed further with respect to FIG. 2.

FIG. 2 shows a plot of the axial magnetic fields exhibited by several different ion laser magnetic confinement schemes. Each plot is with respect to an x axis 202 measuring distance from the cathode end and a y axis 204 measuring axial magnetic field strength and polarity in a specified direction.

A first plot 206 shows the axial magnetic field strength of a prior art ion laser with a single electromagnetic solenoid winding. The axial magnetic field strength is maximum in a region 208 in the body of the laser, and drops off in a region 210 near the end of the solenoid winding, as is well known in the art. The axial magnetic field strength is decreasing, but nonzero, in a cathode transition region 212.

A second plot 214 shows the axial magnetic field strength of a preferred embodiment of this invention, in which the primary winding 136 and the secondary winding 138 generate magnetic fields whose axial components are of opposite polarity. The axial magnetic field strength is maximum in a region 208 in the body of the laser (with a polarity designated as "positive"). The strength of the positive polarity axial magnetic field drops off sharply in a region 210 near the end of the laser. The axial magnetic field strength continues to drop, until it reaches a zero polarity region 216. The field then increases strength in an opposite direction (i.e. "negative" polarity) until it reaches a maximum negative value in a negative field strength region 218. The axial magnetic field strength then decreases towards zero strength in a region 220 near the end of the secondary winding 138.

In a preferred embodiment, the magnetic field generated by the secondary winding 138 may be adjusted in strength from zero to its maximum, allowing an engineer or operator of the laser to optimize performance by reversible adjustment of plasma conditions in the body of the laser.

In a preferred embodiment, the primary winding 136, the secondary winding 138 and the spacer 140 are disposed so that the zero polarity region 216 is located in the body of the laser, in or near a region between the first and second disks 124 at the cathode 112 end of the discharge volume 104. It is beleived that accurate positioning of the zero polarity region 216 is important to optimal operation of an ion laser embodying this invention.

A third plot 222 shows the axial magnetic field strength of an alternate embodiment of this invention, in which the primary winding 136 and the secondary winding 138 generate magnetic fields whose axial components are of the same polarity. The axial magnetic field strength is maximum in a region 208 in the body of the laser, and drops off slowly in a region 210 near the end of the laser. The axial magnetic field strength continues to drop, until it reaches a minimum value in a minimum field strength region 224. The axial magnetic field strength then rises in a region 226 near the end of the secondary winding 138, and finally drops off a second time in a region 228 at the end of the secondary winding 138.

In a preferred embodiment, the primary winding 136, the secondary winding 138 and the spacer 140 are disposed so that the minimum field strength region 224 is located in substantially the same position as disclosed above with respect to the position of the zero polarity region 216.

While preferred embodiments are disclosed herein, many variations are possible which remain within the concept and scope of the invention, and these variations would become clear to one of ordinary skill in the art after perusal of the specification, drawings and claims herein.

For a first example, it would become clear to one of ordinary skill in the art that alteration and/or modification of components of the magnetic confinement field may be accomplished by techniques other than those disclosed herein, such as properly placed permanent magnets, magnetic concentrating materials, and other known techniques. It would also be clear to one of ordinary skill in the art that such alternate techniques may also be employed in an embodiment of the invention, and remain within the concept and scope of the invention.

For a second example, it is believed that benefits may be achieved by alteration and/or modification of the the magnetic confinement field in or near an anode transition region. An embodiment of the invention which achieved such an adjustment would become clear to one of ordinary skill in the art after a perusal of the specification, drawings and claims herein.

For a third example, an embodiment of this invention may comprise an ion laser in which the structural walls comprise a thermally conductive ceramic in direct thermal contact with the arc discharge. An embodiment of the invention which achieved such an adjustment would become clear to one of ordinary skill in the art after a perusal of the specification, drawings and claims herein.

I claim:

1. An ion laser, comprising:
   a cathode and an anode;
   a volume containing an ionized gas disposed between said cathode and said anode, said volume defining a cathode transition region; and
   means for magnetically confining said ionized gas in said cathode transition region.

2. An ion laser, comprising
   a cathode and an anode;
   a volume containing an ionized gas disposed between said cathode and said anode, said volume defining a cathode transition region; and
   at least one magnet for defining a region in said cathode transition region wherein an axial magnetic field is zero.

3. An ion laser as in claim 3, wherein said volume contains a plurality of disks disposed across an axis of said volume.

4. An ion laser as in claim 3, wherein said region is said cathode transition region is located substantially between a first and a second one of said plurality of disks.

5. An ion laser as in claim 2, wherein said volume comprises a thermally conductive ceramic.

6. An ion laser, comprising
   a cathode and an anode;
   a volume containing an ionized gas disposed between said cathode and said anode, said volume defining a cathode transition region; and
   at least one magnet for defining a region in said cathode transition region where an axial magnetic field is locally minimized.

7. An ion laser as in claim 6, wherein said volume contains a plurality of disks disposed across an axis of said volume.

8. An ion laser as in claim 7, wherein said region in said cathode transition region is located substantially between a first and a second one of said plurality of disks.

9. An ion laser as in claim 6, wherein said volume comprises a thermally conductive ceramic.

10. An ion laser, comprising
a cathode and an anode;
a volume containing an ionized gas disposed between said cathode and said anode, said volume defining a cathode transition region;
a first magnetic winding generating a first magnetic field axially aligned with said volume; and
a second magnetic winding generating a second magnetic field axially aligned with said volume.

11. An ion laser as in claim 10, wherein said volume contains a plurality of disks disposed across an axis of said volume.

12. An ion laser as in claim 11, wherein said cathode transition region is located substantially between a first and a second one of said plurality of disks.

13. An ion laser as in claim 10, wherein said volume comprises a thermally conductive ceramic.

14. An ion laser as in claim 10, comprising
means for controlling said first and second magnetic windings, so as to generate first and second magnetic fields of opposite polarity.

15. An ion laser as in claim 10, comprising
means for controlling said first and second magnetic windings, so as to generate first and second magnetic fields of the same polarity with first and second regions of greatest magnetic strength disposed on opposite sides of said cathode transition region.

16. An ion laser as in claim 10, comprising
means for separating said first and second magnetic windings by a nonzero distance.

17. An ion laser as in claim 16, comprising
means for controlling said first and second magnetic windings, so as to generate first and second magnetic fields of opposite polarity.

18. An ion laser as in claim 16, comprising
means for controlling said first and second magnetic windings, so as to generate first and second magnetic fields of the same polarity with first and second regions of greatest magnetic strength disposed on opposite sides of said cathode transition region.

19. A method for operating an ion laser having a cathode, an anode, and a volume containing an ionized gas defining a cathode transition region, comprising the step of
magnetically confining an ionized gas in said cathode transition region of said laser.

20. A method for operating an ion laser having a cathode, an anode, and a volume containing an ionized gas disposed between said cathode and said anode, said volume defining a cathode transition region, comprising the step of
defining a region in said cathode transition region wherein an axial magnetic field is zero.

21. A method as in claim 20, wherein said volume contains a plurality of disks disposed across an axis of said volume, and wherein said region in said cathode transition region is located substantially between a first and a second one of said plurality of disks.

22. A method for operating an ion laser having a cathode, an anode, and a volume containing an ionized gas disposed between said cathode and said anode, said volume defining a cathode transition region, comprising the step of
defining a region in said cathode transition region where an axial magnetic field is locally minimized.

23. A method as in claim 22, wherein said volume contains a plurality of disks disposed across an axis of said volume, and wherein said region in said cathode transition region is located substantially between a first and a second one of said plurality of disks.

24. A method for operating an ion laser having a cathode, an anode, and a volume containing an ionized gas disposed between said cathode and said anode, said volume defining a cathode transition region, comprising the steps of
generating a first magnetic field axially aligned with said volume; and
generating a second magnetic field axially aligned with said volume.

25. A method as in claim 24, wherein said volume contains a plurality of disks disposed across an axis of said volume, and wherein said cathode transition region is located substantially between a first and a second one of said plurality of disks.

26. A method as in claim 24, wherein
said first and second magnetic fields are of opposite plurality.

27. A method as in claim 24, wherein
said first and second magnetic fields are of the same polarity.

28. An ion laser, comprising
a cathode and an anode;
a volume containing an ionized gas disposed between said cathode and said anode, said volume defining a cathode transition region;
a first magnet generating a first magnetic field axially aligned with said volume and having a first region of greatest magnetic strength; and
a second magnet generating a second magnetic field axially aligned with said volume and having a second region of greatest magnetic strength disposed on a side of said cathode transition region opposite from said first region.

29. An ion laser as in claim 28, wherein said volume contains a plurality of disks disposed across an axis of said volume and said cathode transition region is located substantially between a first and a second one of said plurality of disks.

30. An ion laser as in claim 28, comprising
means for controlling said first and second magnetic winding means, so as to generate first and second magnetic fields of opposite polarity.

31. An ion laser as in claim 28, comprising
means for separating said first and second magnetic winding means by a nonzero distance.

32. A method for operating an ion laser having a cathode, an anode, and a volume containing an ionized gas disposed between said cathode and said anode, said volume defining a cathode transition region, comprising the steps of
generating a first magnetic field axially aligned with said volume and having a first region of greatest magnetic strength; and
generating a second magnetic field axially aligned with said volume and having a second region of greatest magnetic strength disposed on a side of said cathode transition region opposite from said first region.

33. A method as in claim 32, wherein said volume contains a plurality of disks disposed across an axis of said volume, and wherein said cathode transition region is located substantially between a first and a second one of said plurality of disks.

34. An method as in claim 32, comprising the step of generating said first and second magnetic fields of opposite polarity.

35. An excited plasma comprising a plurality of ionized atoms magnetically confined in a cathode transition region of an ion laser and having an inverted population characteristic of a laser.

* * * * *